(12) United States Patent
Yamakawa

(10) Patent No.: US 9,027,612 B2
(45) Date of Patent: May 12, 2015

(54) PNEUMATIC TIRE HAVING TREAD PROVIDED WITH THREE-DIMENSIONALLY SHAPED SIPES

(75) Inventor: Takahiro Yamakawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 512 days.

(21) Appl. No.: 13/000,744

(22) PCT Filed: Jun. 19, 2009

(86) PCT No.: PCT/JP2009/061240
§ 371 (c)(1),
(2), (4) Date: Dec. 22, 2010

(87) PCT Pub. No.: WO2010/001742
PCT Pub. Date: Jan. 7, 2010

(65) Prior Publication Data
US 2011/0100519 A1 May 5, 2011

(30) Foreign Application Priority Data

Jul. 2, 2008 (JP) .................................. 2008-173644

(51) Int. Cl.
*B60C 11/12* (2006.01)
*B60C 11/03* (2006.01)

(52) U.S. Cl.
CPC ............. *B60C 11/0302* (2013.04); *B60C 11/12* (2013.01); *B60C 11/1218* (2013.04);
(Continued)

(58) Field of Classification Search
CPC ............. B60C 11/0302; B60C 11/1218; B60C 2011/0388; B60C 2011/1213; B60C 11/12; B60C 2011/1227
USPC .............. 152/209.18, 209.21, DIG. 3, 209.23
See application file for complete search history.

(56) References Cited

U.S. PATENT DOCUMENTS

| 5,109,903 A | 5/1992 | Watanabe et al. |
| 5,885,384 A | 3/1999 | Himuro |

(Continued)

FOREIGN PATENT DOCUMENTS

| EP | 1437238 A1 * | 7/2004 |
| FR | 2703002 A1 * | 9/1994 |

(Continued)

OTHER PUBLICATIONS

Machine translation for Japan 2006-176055 (no date).*

(Continued)

*Primary Examiner* — Steven D Maki
(74) *Attorney, Agent, or Firm* — Carrier Blackman & Associates, P.C.; William D. Blackman; Fulchand P. Shende

(57) ABSTRACT

Provided is a pneumatic tire whose braking performance on ice and partial-wear resistance can be improved. Sipes 11X provided in a rib 5 on a tire equatorial plane TE are formed in such a three-dimensional shape that the amount at which the rib 5 collapses due to an external force is smaller in the tire rotational direction than in a direction opposite to the tire rotational direction. In each block 10 in each shoulder region 1S, sipes 11Ma in a block tread-in side portion 10A are each formed in such a three-dimensional shape that the amount at which the block 10, if entirely provided with the sipes 11Ma, collapses due to an external force will be smaller in the tire rotational direction than in the direction opposite to the tire rotational direction. Sipes 11Mb in a block kick-out side portion 10B are each formed in such a three-dimensional shape that the amount at which the block 10, if entirely provided with the sipes 11Mb, collapses due to an external force will be smaller in the direction opposite to the tire rotational direction than in the tire rotational direction.

16 Claims, 2 Drawing Sheets

(52) U.S. Cl.
CPC . *B60C2011/1213* (2013.04); *B60C 2011/1227* (2013.04); *B60C 2011/1254* (2013.04); *B60C 2011/1295* (2013.04); *B60C 2011/0388* (2013.04)

(56) References Cited

U.S. PATENT DOCUMENTS

| | | | |
|---|---|---|---|
| 5,964,266 A * | 10/1999 | Boiocchi et al. | 152/209.2 |
| 6,427,737 B1 * | 8/2002 | Katayama | 152/DIG. 3 |
| 6,554,034 B1 * | 4/2003 | Minami | 152/DIG. 3 |
| 6,571,844 B1 * | 6/2003 | Ochi et al. | 152/DIG. 3 |
| 7,032,635 B2 | 4/2006 | Hashimoto et al. | |
| 7,416,004 B2 | 8/2008 | Koya | |
| D588,525 S * | 3/2009 | Tanaka | D12/551 |
| 2002/0005238 A1 | 1/2002 | Boiocchi et al. | |
| 2002/0144762 A1* | 10/2002 | Peda et al. | 152/209.8 |
| 2004/0238092 A1 | 12/2004 | Colombo et al. | |
| 2004/0256041 A1 | 12/2004 | Ratliff et al. | |
| 2006/0060276 A1* | 3/2006 | Hashimoto et al. | 152/DIG. 3 |
| 2006/0086445 A1* | 4/2006 | Kishida | 152/209.18 |
| 2009/0078351 A1* | 3/2009 | Ebiko | 152/209.23 |
| 2010/0116392 A1* | 5/2010 | Yamakawa | 152/209.15 |
| 2011/0162770 A1 | 7/2011 | Yamakawa | |

FOREIGN PATENT DOCUMENTS

| | | | |
|---|---|---|---|
| GB | 460 338 A | | 1/1937 |
| GB | 2017597 | * | 10/1979 |
| GB | 2093777 | * | 9/1982 |
| GB | 2 376 217 A | | 12/2002 |
| JP | 62-251206 | * | 11/1987 |
| JP | 5-229311 A | | 9/1993 |
| JP | 6-219108 A | | 8/1994 |
| JP | 08-216623 A | * | 8/1996 |
| JP | 9-020108 A | | 1/1997 |
| JP | 9-328003 A | | 12/1997 |
| JP | 10-016514 A | | 1/1998 |
| JP | 11-115418 A | | 4/1999 |
| JP | 11-310013 A | | 11/1999 |
| JP | 2000-006618 A | | 1/2000 |
| JP | 2001-039126 A | | 2/2001 |
| JP | 2001-213121 A | | 8/2001 |
| JP | 2001-213122 A | | 8/2001 |
| JP | 2002-192917 A | | 7/2002 |
| JP | 2002-240513 A | | 8/2002 |
| JP | 2003-211921 A | | 7/2003 |
| JP | 2003-237320 A | | 8/2003 |
| JP | 2004-025954 A | | 1/2004 |
| JP | 2005-349970 A | | 12/2005 |
| JP | 2006-103464 A | | 4/2006 |
| JP | 2006-176055 | * | 7/2006 |
| JP | 2006-298055 A | | 11/2006 |
| JP | 2007-050738 A | * | 3/2007 |
| JP | 2007-062690 A | | 3/2007 |
| JP | 2008-049971 A | | 3/2008 |
| JP | 2009-073327 A | | 4/2009 |

OTHER PUBLICATIONS

Machine translation for France 2,703,002 (no date).*
Machine translation for Japan 2007-050738 (no date).*
Machine translation for Japan 08-216623 (no date).*
Machine translation for Europe 1,437,238 (no date).*

* cited by examiner

PNEUMATIC TIRE HAVING TREAD PROVIDED WITH THREE-DIMENSIONALLY SHAPED SIPES

TECHNICAL FIELD

The present invention relates to a pneumatic tire used on ice/snow roads, and more specifically to a pneumatic tire whose braking performance on ice and partial-wear resistance are improved.

BACKGROUND ART

In conventional pneumatic tires used on ice/snow roads, numerous sipes extending in the tire widthwise direction are arranged in a tread surface in which a block-based tread pattern is formed. The conventional pneumatic tires are designed to secure a better braking performance on ice from an edge effect brought about by the numerous sipes. In addition, the sipes are each formed in a three-dimensional shape. Thereby, the conventional pneumatic tires are designed: to suppress the collapse of the blocks; to thus secure a wider contact area on an ice/snow road; and to exhibit a much higher performance on ice (see Patent Document 1, for instance).

However, the formation of the numeral sipes in the tread surface inevitably entails a problem that partial wear (heel-and-toe wear) is apt to occur in the blocks, and particularly a problem that partial wear is apt to occur in blocks in shoulder regions which are subjected to heavy load during the cornering. On the other hand, enhancement of the braking performance on ice is important from the standpoint of safety on ice. Accordingly, a further improvement in the pneumatic tires has been required from the viewpoint that the braking performance on ice and the partial-wear resistance should be satisfied at the same time.

PRIOR ART DOCUMENT

Patent Document

Patent Document 1: Japanese patent application Kokai publication No. 2008-49971

SUMMARY OF THE INVENTION

Problem to be Solved by the Invention

An object of the present invention is to provide a pneumatic tire whose braking performance on ice and partial-wear resistance can be improved.

Means of Solving the Problem

The pneumatic tire of the present invention for achieving the above object is a pneumatic tire whose rotational direction is specified as one direction, the pneumatic tire having a tread surface provided with a plurality of circumferential-direction grooves each extending in a tire circumferential direction, and with lateral grooves each extending in a tire widthwise direction, and being arranged in the tire circumferential direction at a predetermined pitch thereby to include a rib formed on a tire equatorial plane in the tread surface and demarcated by the circumferential-direction grooves, and blocks formed in shoulder regions in the tread surface and demarcated by the circumferential-direction grooves and the lateral grooves, the pneumatic tire provided with three-dimensionally shaped sipes extending in the tire widthwise direction and arranged in the tire circumferential direction at predetermined intervals in the rib and each block, the pneumatic tire characterized in that: the sipes provided in the rib are each formed in such a three-dimensional shape that an amount at which the rib collapses when an external force in the tire circumferential direction acts on the rib is smaller in the tire rotational direction than in a direction opposite to the tire rotational direction; the sipes provided in each block include sipes provided in a block tread-in side portion situated in a side of the block in the tire rotational direction, and sipes provided in a block kick-out side portion situated in a side of the block in the direction opposite to the tire rotational direction; the sipes in the block tread-in side portion are each formed in such a three-dimensional shape that an amount at which the block, if entirely provided with the sipes, collapses when an external force in the tire circumferential direction acts on the block will be smaller in the tire rotational direction than in the direction opposite to the tire rotational direction; and the sipes in the block kick-out side portion are each formed in such a three-dimensional shape that an amount at which the block, if entirely provided with the sipes, collapses when an external force in the tire circumferential direction acts on the block will be smaller in the direction opposite to the tire rotational direction than in the tire rotational direction.

Effects of the Invention

According to the present invention, as described above, the sipes provided in each block in each shoulder region where partial wear is apt to occur are made different in such a way that the shape of each sipe in the block tread-in side portion differs from the shape of each sipe in the block kick-out side portion. Thereby, the present invention can reduce the difference (imbalance) between the rigidity of the block in the circumferential direction during the braking and the rigidity of the block in the circumferential direction during the driving. For this reason, the present invention can improve the partial-wear resistance (heel-and-toe resistance) in the blocks in each shoulder region.

Meanwhile, the present invention provides the rib on the tire equatorial plane, and provides the sipes in the rib. Thereby, the present invention can suppress the collapse of the rib during the braking, and thus can secure a wider ground contact area of the rib. For this reason, the present invention can improve the braking performance on ice.

BEST MODES FOR CARRYING OUT THE INVENTION

Referring to the attached drawings, detailed descriptions will be hereinbelow provided for an embodiment of the present invention.

Figure 1:
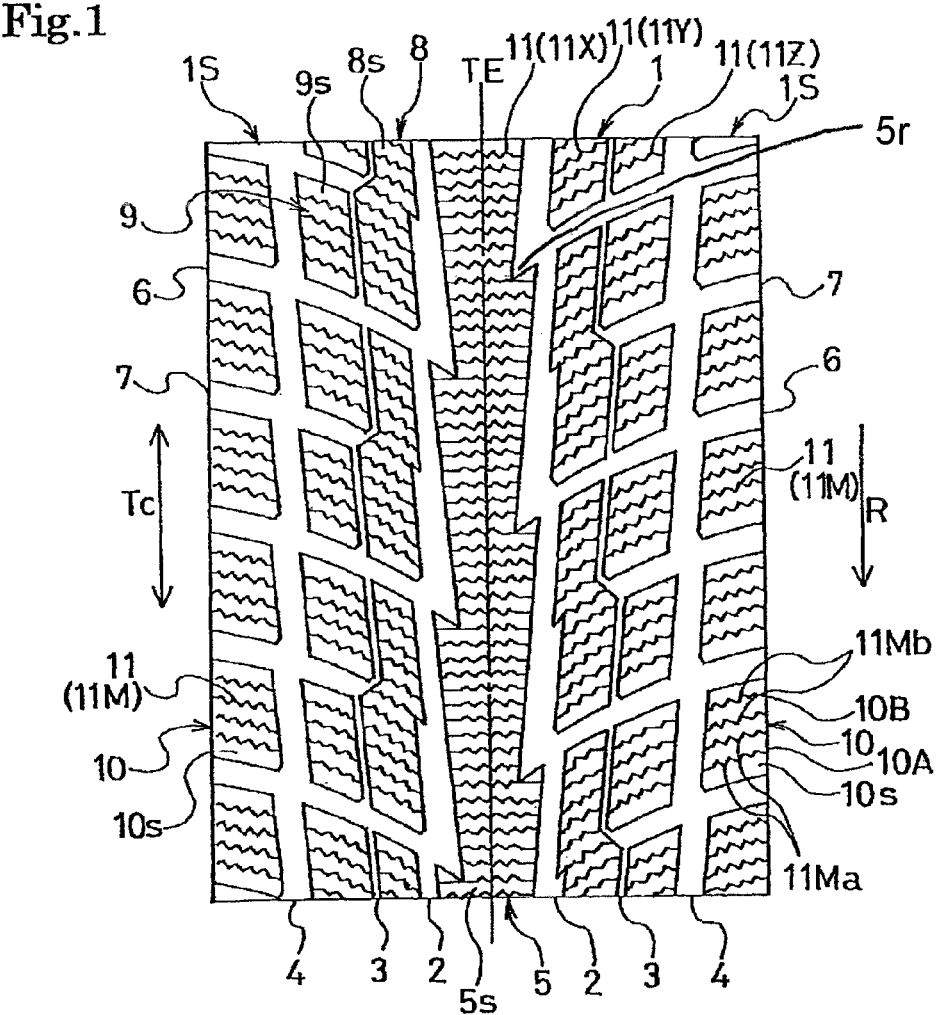
FIG. 1 is a development of a main part of a tread surface, which shows an embodiment of a pneumatic tire according to the present invention.

FIG. 1 shows an embodiment of a pneumatic tire according to the present invention. Reference numeral 1 denotes a tread surface; TC, the tire circumferential direction; and TE, the tire equatorial plane.

This pneumatic tire is a tire whose tire rotational direction is specified as one direction indicated by an arrow R. Multiple circumferential-direction grooves 2, 3, 4 each extending in the tire circumferential direction TC are provided in the tread surface 1. Two circumferential-direction grooves 2 respectively arranged at both left and right sides of the tire equatorial plane TE are formed as see-through circumferential-direction grooves which extend in the tire circumferential direction TC zigzaggedly like a bolt of lightning. A central rib 5 is demarcated and formed on the tire equatorial plane TE in the tread surface 1 by these two circumferential-direction grooves 2. As shown in FIG. 1, the rib 5 has a barbed shape including a plurality of projections which alternate from side to side and which define a recess 5r above each of the projections, respectively. As viewed in a flat two-dimensional representation (such as FIG. 1), each of the projections of the rib points in a direction which defines an obtuse angle in relation to the tire rotational direction R. Note that the see-through circumferential-direction groove referred to in the present invention is a circumferential-direction groove through which one end of the tread surface can be seen from the other end of the tread surface when the tread surface of the tire over the entire circumference is spread.

Two circumferential-direction grooves 3 arranged outside the respective two circumferential-direction grooves 2 in the tire widthwise direction are formed as circumferential-direction narrow grooves: which are narrower in the groove width than the circumferential-direction grooves 2; and which zigzaggedly extend in the tire circumferential direction TC. These circumferential-direction grooves 3 are not see-through circumferential-direction grooves. Two circumferential-direction grooves 4 arranged outside the respective two circumferential-direction grooves 3 in the tire widthwise direction are formed as see-through circumferential-direction grooves zigzaggedly extending in the tire circumferential direction TC, and have a groove width which is equal to that of the circumferential-direction grooves 2.

First lateral grooves 6 and second lateral grooves 7 are alternately arranged in the tire circumferential direction TC at a predetermined pitch. The first lateral grooves 6 are arcuate in shape and extend outward from each of the recesses of the rib 5 in the tire widthwise direction all of the way to the outer shoulder of the tire beyond the corresponding tire ground contact end, while tilting in a direction opposite to the tire rotational direction (upward in FIG. 1). The second lateral grooves 7 extend outward from each circumferential-direction groove 3 in the tire widthwise direction beyond the corresponding tire ground contact end while tilting in the direction opposite to the tire rotational direction.

Between each two neighboring circumferential-direction grooves 2, 3, blocks 8 are demarcated and formed by these circumferential-direction grooves 2, 3 and the first lateral grooves 6. Between each two neighboring circumferential-direction grooves 3, 4, blocks 9 are demarcated and formed by these circumferential-direction grooves 3, 4 and the lateral grooves 6, 7. The blocks 8 have a length in the tire circumferential direction which is almost twice as long as a length of the blocks 9 in the tire circumferential direction. Thereby, the rigidity of the blocks 8 in the tire circumferential direction is significantly larger than that of the blocks 9. In a shoulder region 1S in the tread surface 1 which is located outside each circumferential-direction groove 4 in the tire widthwise direction, blocks 10 demarcated by the circumferential-direction groove 4 and the lateral grooves 6, 7 are formed.

Three-dimensionally shaped sipes 11 zigzaggedly extending in the tire widthwise direction are arranged in the tire circumferential direction TC at predetermined intervals in each of surfaces 5s, 8s, 9s, 10s of the rib 5 and the blocks 8, 9, 10. The sipes 11X provided in the rib 5 extend in a way to traverse the rib 5, and the two ends of each sipe 11X are opened to the respective circumferential-direction grooves 2. The sipes 11Y provided in each block 8 extend in a way to traverse the block 8, and the two ends of each sipe 11Y are opened to the corresponding circumferential-direction grooves 2, 3, respectively. The sipes 11Z provided in each block 9 extend in a way to traverse the block 9, and the two ends of each sipe 11Z are opened to the corresponding circumferential-direction grooves 3, 4, respectively. One end of each of the sipes 11M provided in each block 10 is opened to the corresponding circumferential-direction groove 4, and the other end of the sipe 11M extends to a position beyond the corresponding tire ground contact end.

Figure 2:
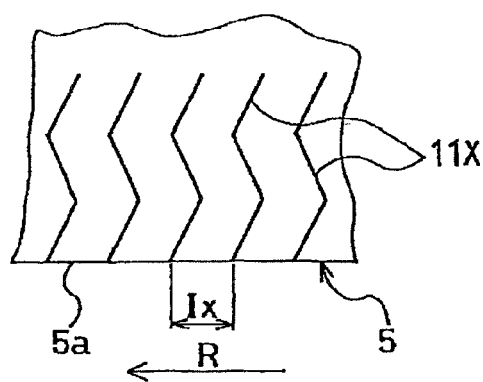
FIG. 2 is a partially magnified cross-sectional view of a rib provided with sipes.

The sipes 11X provided in the rib 5 are each formed in such a three-dimensional shape that, the amount at which the rib collapses when an external force in the tire circumferential direction TC acts on the rib 5 (or on a portion of the rib which becomes in contact with the road) while the tire is in contact with the road, is smaller in the tire rotational direction than in the direction opposite to the tire rotational direction. As such sipes 11X, for instance, sipes maybe used which are formed zigzaggedly in the depth direction, as shown in FIG. 2, in a way that: the sipes extend from the surface 5a of the rib 5 in the depth direction while tilting in the direction opposite to the tire rotational direction; subsequently, the sipes extend in the depth direction while tilting in the tire rotational direction; and the sipes further extend in the depth direction while tilting in the direction opposite to the tire rotational direction.

The sipes 11M provided in each block 10 in each shoulder region 1S include: sipes 11Ma provided in a block tread-in side portion 10A which is situated beyond the tire circumferential-direction center of the block 10 in the tire circumferential direction; and sipes 11Mb provided in a block kick-out side portion 10B which is situated beyond the tire circumferential-direction center of the block 10 in the direction opposite to the tire circumferential direction.

The sipes 11Ma in each block tread-in side portion 10A are each formed in such a three-dimensional shape that the amount at which the block 10, if entirely provided with the sipes 11Ma, collapses when an external force in the tire circumferential direction TC acts on the block which becomes in contact with the road while the tire is in contact with the road, will be smaller in the tire rotational direction than in the direction opposite to the tire rotational direction.

As such sipes 11Ma, for instance, sipes which are formed in the same manner as are the above-described sipes 11X may be used. Specifically, sipes may be used which are formed zigzaggedly in the depth direction, as shown in FIG. 3, in a way that: the sipes extend from the surface 10s of the block 10 in the depth direction while tilting in the direction opposite to the tire rotational direction; subsequently, the sipes extend in the depth direction while tilting in the tire rotational direction; and the sipes further extend in the depth direction while tilting in the direction opposite to the tire rotational direction.

The sipes 11Mb in each block kick-out side portion 10B are each formed in such a three-dimensional shape that the amount at which the block, if entirely provided with the sipes 11Mb, collapses when an external force in the tire circumferential direction TC acts on the block which becomes in contact with the road while the tire is in contact with the road, will be smaller in the direction opposite to the tire rotational direction than in the tire rotational direction.

Figure 3:
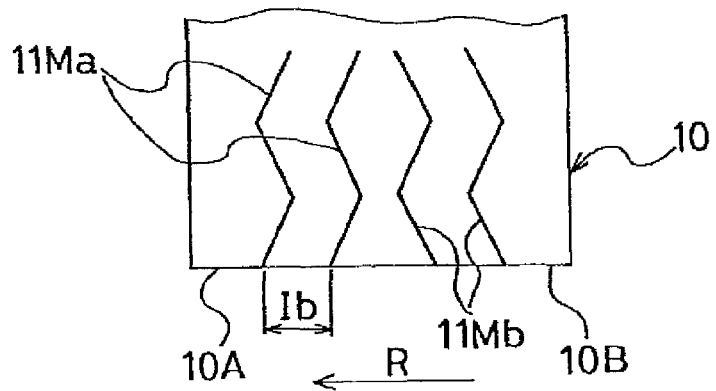
FIG. 3 is a magnified cross-sectional view of a block with sipes.

As such sipes 11Mb, for instance, sipes may be used which are formed zigzaggedly in the depth direction, as shown in FIG. 3, in a way that: the sipes extend from the surface 10s of the block 10 in the depth direction while tilting in the tire rotational direction; subsequently, the sipes extend in the depth direction while tilting in the direction opposite to the tire rotational direction; and the sipes further extend in the depth direction while tilting in the tire rotational direction.

Both the sipes 11Y provided in each block 8 and the sipes 11Z provided in each block 9 are formed in the same manner as are the sipes 11M provided in each block 10.

In the case of the present invention, as described above, the sipes 11M provided in each block 10 in each shoulder region 1S where partial wear is apt to occur are made different in such away that the sipes 11M in the block tread-in side portion 10A differ from the sipes 11M in the block kick-out side portion 10B. Thereby, the present invention can reduce the difference (imbalance) between the rigidity of the block 10 in the circumferential direction during the braking and the rigidity of the block 10 in the circumferential direction during the driving. For this reason, the present invention can improve the partial-wear resistance in the blocks 10 in each shoulder region 1S.

Meanwhile, the rib 5 is formed on the tire equatorial plane TE, and the sipes 11X are provided in this rib 5. Thereby, the amount at which the rib 5 collapses during the braking is made smaller. For this reason, it is possible to secure a wider ground contact area of the rib 5 during the braking, and to improve the braking performance on ice. The rib 5 is harder to collapse during the driving than the blocks because in the rib 5, a land portion continues in the tire circumferential direction TC. For this reason, it is possible to secure a sufficient driving performance as well.

In the case of the present invention, it is desirable to provide the sipes 11X in the rib 5 in a way that an interval Ix between the sipes 11X is narrower than an interval Ib between the sipes 11Y provided in each block 8, between the sipes 11Z provided in each block 9, and between the sipes 11M provided in each block 10. Because the rib 5 is harder to collapse than the blocks 8, 9, 10, the sipes 11X may be densely provided in the rib 5. This makes it possible to increase the number of sipes, and to thus enhance the edge effect, as well as to improve the braking performance on ice further.

Figure 4A:
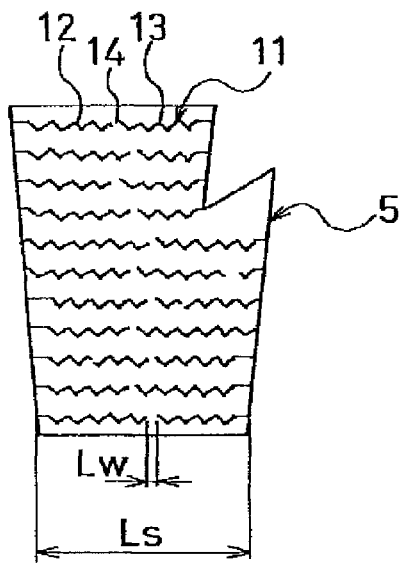
FIG. 4A is a partial plan view of a rib provided with sipes as another example.
Figure 4B:
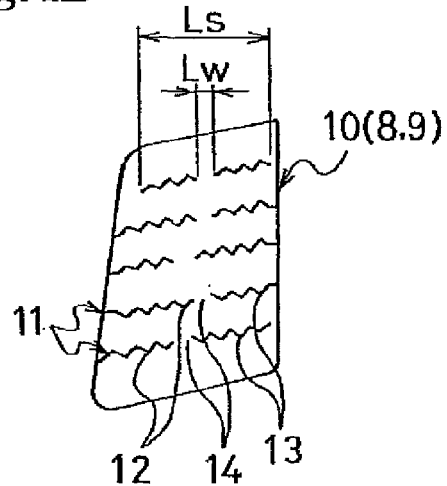
FIG. 4B is a partial plan view of a block provided with sipes as yet another example.

It is desirable that each sipe 11 should be made up of paired left and right sipe portions 12, 13 which are separated from each other in the tire widthwise direction as shown in FIG. 4. The formation of each sipe 11 from the two left and right divisions makes it possible to attain the foregoing effect while suppressing the reduction of the rigidity of each of the rib 5 and the blocks 8, 9, 10.

In addition, it is desirable that portions 14, each of which separates the corresponding paired left and right sipe portions 12, 13 from each other, should be arranged in a staggered pattern in the tire circumferential direction TC. This makes it possible to avoid the occurrence (uneven distribution) of portions in each of which no sipe 11 divided into two parts exists when viewed in the tire circumferential direction TC. For this reason, a better water film removing effect can be obtained from the sipes 11 each divided into two parts while suppressing the reduction of the rigidity of each of the rib 5 and the blocks 8, 9, 10. Furthermore, it is advantageous that, because the separating portions 14 are arranged in a staggered pattern in the tire circumferential direction TC in each block 10 in each shoulder region 1S, the partial-wear resistance is higher than when the separating portions 14 are arranged in a row.

It is desirable that a length Lw of each separating portion 14 in the tire widthwise direction should be set in a range of 2 to 20% of a length Ls of the corresponding sipe 11 in the widthwise direction. If the length Lw in the tire widthwise direction is shorter than 2% of the length Ls in the widthwise direction, it is impossible to effectively suppress the reduction of the rigidity of each of the rib 5 and the blocks 8 to 10. On the other hand, if the length Lw in the tire widthwise direction exceeds 20% of the length Ls in the widthwise direction, the length of the sipe 11 is insufficient, and it is accordingly difficult to secure a sufficient edge effect.

The present invention can be preferably used for pneumatic tires for ice/snow roads, which are used particularly for passenger cars, yet is not limited to such tires.

EXAMPLES

Figure 5:
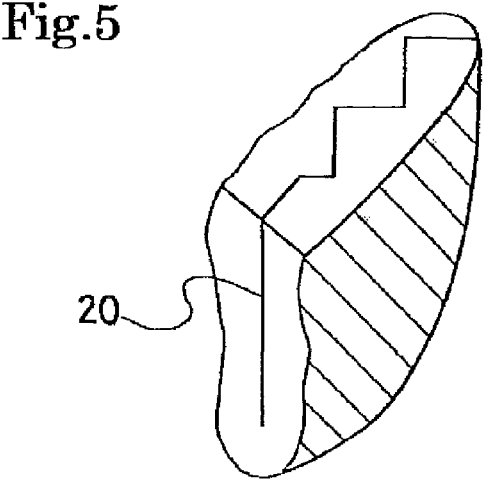
FIG. 5 is a partial perspective view showing a sipe in a reference tire according to an example.

As experimental tires, tires 1 (Example 1) according to the present invention, tires 2 (Example 2) according to the present invention, tires 3 (Example 3) according to the present invention, reference tires (Reference Example), and comparative tires (Comparative Example) were produced with a common tire size of 225/65R17. The tires 1 according to the present invention and the tires 2 according to the present invention had a configuration shown in FIG. 1 in which: the sipes shown in FIG. 2 were provided in the rib on the tire equatorial plane; the sipes shown in FIG. 3 were formed in each block in each shoulder region; and the interval between the sipes in the rib and the interval between the sipes in the block were set as shown in Table 1. The tires 3 according to the present invention had the same configuration as did the tires 2 according to the present invention, except that each sipe in the rib on the tire equatorial plane and each sipe in each block in each shoulder region were made up of paired left and right sipe portions as shown in FIG. 4 (where the length Lw of the separating portion in the tire widthwise direction was 14% of the length Ls of the sipe in the widthwise direction). The reference tires were provided with sipes 20 shown in FIG. 5, which were not directional in a way to zigzaggedly extend in the surface and to straightly extend in the depth direction, in the rib on the tire equatorial plane and each block in each shoulder region. The comparative tires were provided with the sipes shown in FIG. 2, which were directional, in the rib on the tire equatorial plane and each block in each shoulder region.

These experimental tires were mounted on the respective wheels with a rim size of 17×7J, and the air pressure of each of the thus-mounted experimental tires was set at 200 kPa. For each type of experimental tires, the resultant tires were attached to a vehicle with a cubic capacity of 2400 cc, and the braking performance on ice and the partial-wear resistance were tested and evaluated with the below-described test methods. Table 1 shows the result.

[Braking Performance on Ice]

Full braking was applied while straight running on an ice-road test course at a speed of 40 km/h, and the distance the vehicle ran before the vehicle stopped was measured. The evaluation result is shown by indexed values with the reference tires being indexed at 100. A larger indexed value means a better braking performance on ice.

[Partial-Wear Resistance]

After running 20000 km in a dry-road test course, the amount of partial wear having occurred in the blocks in the shoulder regions was measured. The evaluation result is shown by indexed values with the reference tires being indexed at 100. A larger indexed value means a better partial-wear resistance.

TABLE 1

| | Reference Example | Example 1 | Example 2 | Example 3 | Comparative Example |
|---|---|---|---|---|---|
| Difference b/w intervals of sipes in rib and intervals of sipes in block | None | None | Intervals of sipes in Rib are smaller | Intervals of sipes in Rib are smaller | None |
| Braking performance on ice | 100 | 102 | 105 | 105 | 105 |
| Partial-wear resistance | 100 | 105 | 105 | 107 | 95 |

It is learned from Table 1 that the braking performance on ice and the partial-wear resistance of the tires according to the present invention were able to be improved. In addition, it is learned from the tires 3 according to the present invention that the partial-wear resistance was able to be further improved while improving the braking performance on ice by: forming each sipe from the paired left and right sipe portions; and arranging in a staggered pattern the portions, each of which separates the corresponding left and right sipe portions from each other.

EXPLANATION OF REFERENCE NUMERALS 1 tread surface
1S shoulder region
2, 3, 4 circumferential-direction groove
5 rib
6 first lateral groove
7 second lateral groove
10 block
10A block tread-in side portion
10B block kick-out side portion
11, 11M, 11X sipe
14 separating portion
Ib, Ix interval
TC tire circumferential direction
TE tire equatorial plane

What is claimed is:
1. A pneumatic tire whose rotational direction is specified as one direction, the pneumatic tire having a tread surface provided with a plurality of circumferential-direction grooves each extending in a tire circumferential direction, and with lateral grooves each extending in a tire widthwise direction, and including first lateral grooves and second lateral grooves being alternately arranged in the tire circumferential direction at a predetermined pitch, wherein the second lateral grooves are shorter in lengths compared to lengths of the first lateral grooves, thereby to include
a rib formed on a tire equatorial plane in the tread surface and demarcated by the circumferential-direction grooves, and
blocks formed in shoulder regions in the tread surface and demarcated by the circumferential-direction grooves and the lateral grooves, wherein the said second lateral grooves terminate at the blocks adjacent to said rib,
the pneumatic tire is provided with three-dimensionally shaped sipes extending in the tire widthwise direction and arranged in the tire circumferential direction at predetermined intervals in the rib,
each of the blocks further includes three-dimensionally shaped sipes arranged substantially parallel to each other and also parallel to the sipes arranged in immediately adjacent blocks;
wherein:
the sipes provided in the rib are each formed in a three-dimensional shape and extend zigzaggedly in a depth direction, and the rib is configured such that an amount at which the rib collapses, when an external force in the tire circumferential direction acts on the rib, is smaller in the tire rotational direction than in a direction opposite to the tire rotational direction;
the sipes provided in each block include sipes provided in a block tread-in side portion situated in a side of the block in the tire rotational direction, and sipes provided in a block kick-out side portion situated in a side of the block in the direction opposite to the tire rotational direction;
the sipes in the block tread-in side portion are each formed in such a three-dimensional shape that an amount at which the block, if entirely provided with the sipes, collapses when an external force in the tire circumferential direction acts on the block will be smaller in the tire rotational direction than in the direction opposite to the tire rotational direction; and
the sipes in the block kick-out side portion are each formed in such a three-dimensional shape that an amount at which the block, if entirely provided with the sipes, collapses when an external force in the tire circumferential direction acts on the block will be smaller in the direction opposite to the tire rotational direction than in the tire rotational direction.

2. The pneumatic tire according to claim 1, wherein the intervals at which the sipes are provided in the rib are narrower than the intervals at which the sipes are provided in each block.

3. The pneumatic tire according to claim 2, wherein:
each sipe is made up of paired left and right sipe portions separated from each other in the tire widthwise direction; and
separating portions are arranged in a staggered pattern in the tire circumferential direction.

4. The pneumatic tire according to claim 3, wherein a length Lw of each separating portion in the tire widthwise direction is 2 to 20% of a length Ls of the corresponding sipe in the widthwise direction.

5. The pneumatic tire according to claim 1, wherein:
each sipe is made up of paired left and right sipe portions separated from each other in the tire widthwise direction; and
separating portions are arranged in a staggered pattern in the tire circumferential direction.

6. The pneumatic tire according to claim 5, wherein a length Lw of each separating portion in the tire widthwise direction is 2 to 20% of a length Ls of the corresponding sipe in the widthwise direction.

7. The pneumatic tire of claim 1, wherein the sipes provided in the rib extend to traverse the rib, and the two ends of each sipe of the rib are opened to the respective circumferential-direction grooves adjacent the rib.

8. The pneumatic tire of claim 7, wherein:
the rib is formed to have a barbed shape including a plurality of projections which alternate from side to side and which define recesses proximate the projections,
the tire is configured with a tread pattern in which each of said first lateral grooves extends outwardly from each of the respective recesses of the rib, and continues all of the way to the outer shoulder of the tire, and
when viewed in a flat two-dimensional representation, each of said projections of said rib points in a direction which defines an obtuse angle in relation to the tire rotational direction.

9. The pneumatic tire of claim 1, wherein the sipes of the rib extend from the outer surface of the rib in the depth direction while tilting in the direction opposite to the tire rotational direction for a first portion of the rib depth and then change direction so that subsequently, the sipes continue in the depth direction while tilting in the tire rotational direction for a second portion of the rib depth and then change direction again, and the sipes then further extend in the depth direction while tilting in the direction opposite to the tire rotational direction for a third portion of the rib depth.

10. The pneumatic tire of claim 9, wherein:
the rib is formed to have a barbed shape including a plurality of projections which alternate from side to side and which define recesses proximate the projections,
the tire is configured with a tread pattern in which each of said first lateral grooves extends outwardly from each of the respective recesses of the rib, and continues all of the way to the outer shoulder of the tire, and
when viewed in a flat two-dimensional representation, each of said projections of said rib points in a direction which defines an obtuse angle in relation to the tire rotational direction.

11. The pneumatic tire of claim 1, wherein:
the sipes of the rib extend in a direction so as to traverse the rib,
the sipes in the block tread-in side portion of each of the blocks extend from the surface of the block in the depth direction while tilting in the direction opposite to the tire rotational direction; subsequently, extend in the depth direction while tilting in the tire rotational direction; and then, further extend in the depth direction while tilting in the direction opposite to the tire rotational direction, and
the sipes in the block kick-out side portion of each of the blocks extend from the surface of the block in the depth direction while tilting in the tire rotational direction; subsequently, extend in the depth direction while tilting in the direction opposite to the tire rotational direction; and then, further extend in the depth direction while tilting in the tire rotational direction.

12. The pneumatic tire of claim 1, wherein:
the rib is formed to have a barbed shape including a plurality of projections which alternate from side to side and which define recesses proximate the projections,
the tire is configured with a tread pattern in which each of said first lateral grooves extends outwardly from each of the respective recesses of the rib, and continues all of the way to the outer shoulder of the tire, and
when viewed in a flat two-dimensional representation, each of said projections of said rib points in a direction which defines an obtuse angle in relation to the tire rotational direction.

13. The pneumatic tire of claim 1, wherein the blocks are formed in a plurality of rows in the circumferential direction, the plurality of the rows including a central block row, an intermediate block row and a shoulder block row on each side of rib; and wherein a number of blocks in said intermediate block row is twice the number of blocks in the central block row.

14. The pneumatic tire of claim 1, wherein the rib is substantially continuous in a circumferential direction of the tire, and wherein said rib has a barbed shape.

15. A pneumatic tire whose rotational direction is specified as one direction, the pneumatic tire having a tread surface provided with a plurality of circumferential-direction grooves each extending in a tire circumferential direction, the tread surface including shoulder regions at lateral edges thereof,
and with a plurality of lateral grooves comprising first lateral grooves, and second lateral grooves shorter than the first lateral grooves alternately formed therein, each extending in a tire widthwise direction, and being arranged in the tire circumferential direction at a predetermined pitch, the tire comprising:
a central rib formed on a tire equatorial plane in the tread surface and demarcated by the circumferential-direction grooves, the rib being substantially continuous in a circumferential direction of the tire, and having a barbed shape, and
a plurality of blocks formed in the shoulder regions of the tread surface and demarcated by the circumferential-direction grooves and the lateral grooves,
the pneumatic tire is provided with three-dimensionally shaped sipes extending in the tire widthwise direction and arranged in the tire circumferential direction at predetermined intervals in the rib and
each of blocks further includes three-dimensionally shaped sipes arranged substantially parallel to each other and also parallel to the sipes arranged in immediately adjacent blocks, wherein:
each of said first lateral grooves extends outwardly from each of respective recesses of the rib, and continues all of the way to the outer shoulder of the tire,
the rib is formed to have a barbed shape including a plurality of projections which alternate from side to side and which define recesses proximate the projections;
the sipes provided in the rib are each formed in a three-dimensional shape and extend zigzaggedly in a depth direction, and the rib is configured such that an amount at which the rib collapses, when an external force in the tire circumferential direction acts on the rib, is smaller in the tire rotational direction than in a direction opposite to the tire rotational direction;
the sipes provided in each block include sipes provided in a block tread-in side portion situated in a side of the block in the tire rotational direction, and sipes provided in a block kick-out side portion situated in a side of the block in the direction opposite to the tire rotational direction;
the sipes in the block tread-in side portion are each formed in such a three-dimensional shape that an amount at which the block, if entirely provided with the sipes, collapses when an external force in the tire circumferential direction acts on the block will be smaller in the tire rotational direction than in the direction opposite to the tire rotational direction; and
the sipes in the block kick-out side portion are each formed in such a three-dimensional shape that an amount at which the block, if entirely provided with the sipes, collapses when an external force in the tire circumferential direction acts on the block will be smaller in the direction opposite to the tire rotational direction than in the tire rotational direction.

16. The pneumatic tire of claim 15, wherein the blocks are formed in a plurality of rows in the circumferential direction, the plurality of the rows including a central block row, an intermediate block row and a shoulder block row on each side of rib; and wherein a number of blocks in said intermediate block row is twice the number of blocks in the central block row.

* * * * *